(12) United States Patent
Jansen et al.

(10) Patent No.: US 9,056,445 B2
(45) Date of Patent: Jun. 16, 2015

(54) MULTILAYER SHEET AND METHODS OF MAKING AND ARTICLES COMPRISING THE MULTILAYER SHEET

(75) Inventors: Bernardus Johannes Paulus Jansen, Bergen op Zoom (NL); Christianus Johannes Jacobus Maas, Rilland (NL); Andries Adriaan Volkers, Wouw (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 63 days.

(21) Appl. No.: 12/787,448

(22) Filed: May 26, 2010

(65) Prior Publication Data

US 2011/0293927 A1    Dec. 1, 2011

(51) Int. Cl.
*B32B 27/08* (2006.01)
*B32B 27/36* (2006.01)
*C08K 5/42* (2006.01)

(52) U.S. Cl.
CPC ............. *B32B 27/08* (2013.01); *Y10T 428/263* (2015.01); *Y10T 428/266* (2015.01); *B32B 27/36* (2013.01); *C08K 5/42* (2013.01)

(58) Field of Classification Search
CPC ................... Y10T 428/2848; Y10T 428/266; Y10T 428/263; Y10T 428/264; Y10T 428/1121; Y10T 428/1317; Y10T 428/1321; B32B 27/08; B32B 15/08; B32B 27/00
USPC ........................................................ 428/334
See application file for complete search history.

(56) References Cited

U.S. PATENT DOCUMENTS

| | | |
|---|---|---|
| 3,775,367 A | 11/1973 | Nouvertne |
| 3,929,908 A | 12/1975 | Orlando et al. |
| 4,170,711 A | 10/1979 | Orlando et al. |
| 4,774,273 A | 9/1988 | Kress et al. |
| RE33,032 E | 8/1989 | Binsack et al. |
| 4,923,933 A | 5/1990 | Curry |
| 5,045,582 A | 9/1991 | Hashimoto et al. |
| 5,356,965 A | 10/1994 | Weider et al. |
| 7,652,083 B2 | 1/2010 | Mullen |
| 7,709,562 B2 | 5/2010 | Li et al. |
| 2003/0229165 A1 | 12/2003 | Hoeks et al. |
| 2005/0095433 A1 | 5/2005 | Bogerd et al. |
| 2007/0048527 A1* | 3/2007 | Agarwal et al. ............... 428/412 |
| 2007/0191519 A1 | 8/2007 | Jiao et al. |

(Continued)

FOREIGN PATENT DOCUMENTS

| | | |
|---|---|---|
| WO | 2007024456 A1 | 3/2007 |
| WO | 2009009308 A1 | 1/2009 |

(Continued)

OTHER PUBLICATIONS

Product brochure of KSS, Jan. 8, 2007. (2007).*

(Continued)

*Primary Examiner* — Samir Shah
(74) *Attorney, Agent, or Firm* — Cantor Colburn LLP

(57) ABSTRACT

In some embodiments, a multilayer sheet comprises: a first cap layer formed from a first cap composition comprising polycarbonate and potassium perfluorobutane sulfonate; a second cap layer formed from a second cap composition comprising polycarbonate and potassium perfluorobutane sulfonate; and a core layer formed from a core composition comprising polycarbonate and without potassium perfluorobutane sulfonate. The core layer is disposed between the first cap layer and the second cap layer.

13 Claims, 1 Drawing Sheet

(56) References Cited

U.S. PATENT DOCUMENTS

| | | | |
|---|---|---|---|
| 2007/0231576 A1* | 10/2007 | Davis et al. ............... | 428/412 |
| 2008/0081860 A1 | 4/2008 | Li et al. | |
| 2009/0326116 A1 | 12/2009 | Cojocariu et al. | |
| 2010/0280159 A1* | 11/2010 | Maas et al. ............... | 524/162 |
| 2010/0330362 A1 | 12/2010 | Matsumoto et al. | |
| 2011/0112226 A1 | 5/2011 | Rudiger et al. | |

FOREIGN PATENT DOCUMENTS

| | | | |
|---|---|---|---|
| WO | 2010090893 A1 | 8/2010 | |
| WO | 2011054865 A2 | 5/2011 | |

OTHER PUBLICATIONS

International Search Report; International Application No. PCT/IB2011/052284; International Filing Date: May 25, 2011; Date of Mailing: Aug. 10, 2011; 5 pages.

Written Opinion of the International Searching Authority; International Application No. PCT/IB2011/052284; International Filing Date: May 25, 2011; Date of Mailing: Aug. 10, 2011; 7 pages.

European Patent No. 2011054865 (A2); Publication Date: May 12, 2011; Abstract Only; 1 Page.

\* cited by examiner

MULTILAYER SHEET AND METHODS OF MAKING AND ARTICLES COMPRISING THE MULTILAYER SHEET

BACKGROUND

The present disclosure generally relates to multilayered sheets, and more particularly to multilayered sheets having flame retarding properties.

Thermoplastic (e.g., polycarbonate) sheet materials are commonly used in electrical applications such as covers for electrical switch boxes. These applications typically have strict fire safety requirements that the sheet materials must meet to be used in electrical applications. Various requirements have been placed on the flame retardant properties of the sheet materials used in these applications, such as UL94 testing and Glow Wire testing. Thermoplastic sheet materials are also commonly used in transportation interior applications. The thermoplastic sheets can be used in interior applications, such as partition walls, ceiling panels, cabinet walls, storage compartments, galley surfaces, light panels, window shades, and the like. All of these applications have various fire safety requirements that the materials must meet in order to be used in the interior applications. Various requirements have been placed on the flame retardance and smoke density properties of the materials used in the construction of these interior panels and parts.

In some applications, in addition to meeting flame retardance and smoke density properties, the transparency of the sheet can be an issue. Although the sheet may meet flame retardance and smoke density requirements for a given application, it may not meet the desired haze requirements.

Materials that can meet or exceed the various fire safety requirements (e.g., in electrical applications), and/or that have a desired haze level, and/or that are made from environmentally friendly sheet materials, are desired in the industry. Additionally, materials that meet or exceed the various fire safety requirements in transportation interior applications are also desired.

BRIEF DESCRIPTION

Disclosed herein are multilayer sheets, methods for making the multilayer sheets, and articles comprising the multilayer sheets.

In some embodiments, a multilayer sheet comprises: a first cap layer formed from a first cap composition comprising polycarbonate and potassium perfluorobutane sulfonate; a second cap layer formed from a second cap composition comprising polycarbonate and potassium perfluorobutane sulfonate; and a core layer formed from a core composition comprising polycarbonate and without potassium perfluorobutane sulfonate. The core layer is disposed between the first cap layer and the second cap layer.

In one embodiment a method of making a multilayer sheet comprises: forming a core layer formed from a core composition comprising polycarbonate; forming a first cap layer formed from a first cap composition comprising polycarbonate and potassium perfluorobutane sulfonate wherein the first cap layer is co-extruded onto a surface of the core layer; and forming a second cap layer formed from a second cap composition comprising polycarbonate and potassium perfluorobutane sulfonate wherein the second cap layer is co-extruded onto a surface of the core layer opposite the surface co-extruded with the first cap layer.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
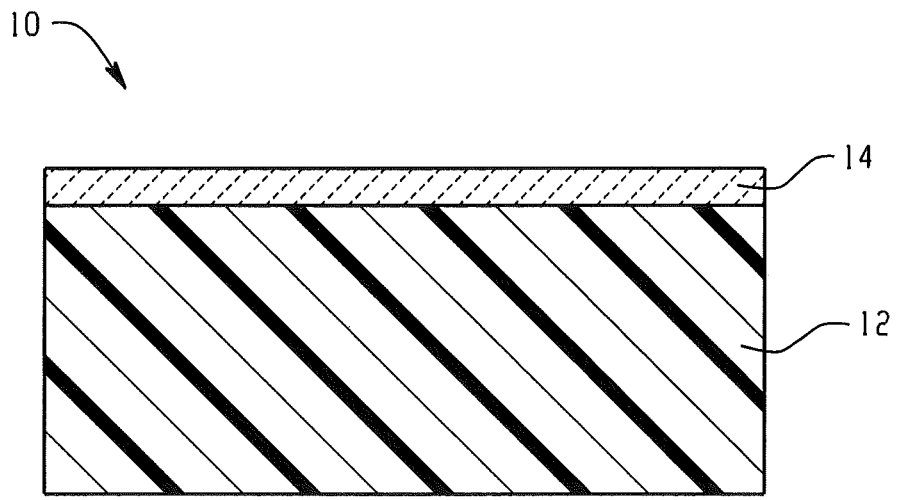
FIG. 1 is a depiction of a multilayered sheet with a first (cap) layer disposed upon and in intimate contact with a surface of a core layer.
Figure 2:
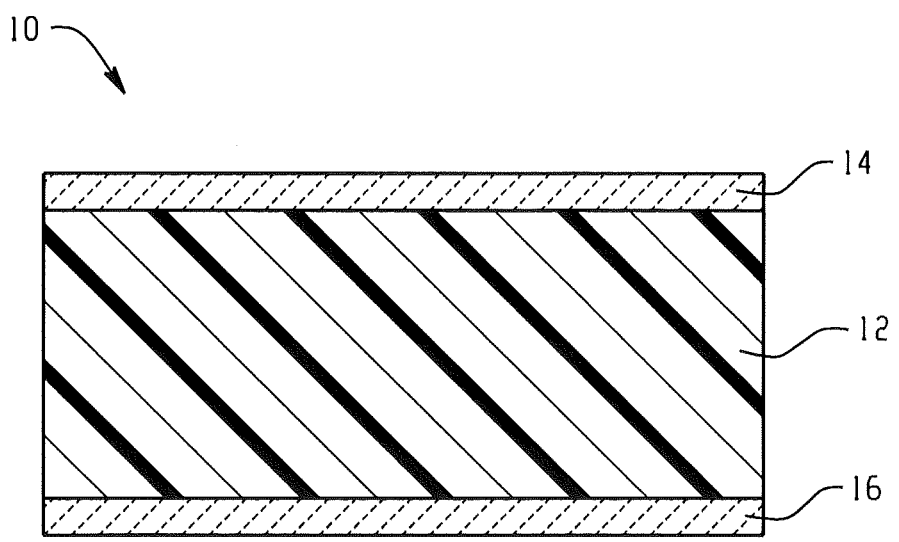
FIG. 2 is a depiction of a multilayered sheet with a core layer disposed between a first cap layer and a second cap layer.

A transparent, monolayer sheet comprising potassium perfluorobutane sulfonate (Rimar Salt) in the core layer can pass UL94 V0 test requirements at a thickness of 1.8 millimeters (mm), but the sheet possesses undesirably high haze (i.e., greater than or equal to 1.5% as determined in accordance with ASTM D1003-00, Procedure A, using a HAZE-GUARD DUAL from BYK-Gardner, using and integrating sphere (0°/diffuse geometry), wherein the spectral sensitivity conforms to the CIE standard spectral value under standard lamp D65. The monolayer sheet, therefore, can have issues passing the haze test.

Disclosed herein are transparent multilayer sheets comprising polycarbonate that can be employed in the desired field, for example, in electrical and/or vehicular interior applications. The multilayer sheets can comprise a flame retardant additive such as potassium perfluorobutane sulfonate (i.e., Rimar Salt) while still meeting flammability and safety requirements, comprise a suitable haze rating (e.g., less than 1.5% haze), and meet the requirements needed to consistently pass the smoke density test as set forth in ASTM E662-3 (i.e., the average of three samples always possesses a smoke density at four minutes of less than 200 particles). The transparent multilayer sheets disclosed herein utilize a multilayer construction comprising core layer(s) and cap layer(s) where the core layer(s) and cap layer(s) each comprise polycarbonate and the cap layer(s) additionally comprise Rimar Salt. The cap layers are located on both sides of the core layer, although it is contemplated that a cap layer can also be located on one side of the core layer.

The use of Rimar Salt as a flame retardant additive in transparent, monolayer sheet applications with a thickness greater than 1.5 mm, generally results in undesirably high haze values (e.g., greater than or equal to 1.5%). Advantageously, it has been discovered that a multilayer sheet comprising first and second cap layers formed from cap compositions comprising polycarbonate and Rimar Salt, wherein the core layer is formed from a core composition comprising polycarbonate and not Rimar Salt (e.g., is free of Rimar Salt), can attain a UL94 V0 flammability rating (e.g., even at a thickness of less than or equal to 2.0 mm, and possess a haze value of less than 1.5%. This multilayer sheet can even consistently pass the smoke density test and pass a Glow Wire test at 960° C. Desirably, the core and cap layer compositions are capable of giving the multilayer sheet an Eco label according to DIN/VDE 0472 Part 815.

Transparent polycarbonates that can be used in the multilayer sheets include copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example a combination of branched and linear polycarbonate. Exemplary polycarbonate materials include LEXAN* Resin commercially available from SABIC Innovative Plastics IP as well as LEXAN* EXL Resin also commercially available from SABIC Innovative Plastics IP. Some exemplary polycarbonates include those disclosed in commonly assigned U.S. Pat. No. 7,652,083, and commonly assigned U.S. Pat. No. 7,709,562.

The nitrile end-capped polycarbonate (e.g., cyanophenyl end-capped polycarbonate) can be a polycarbonate having repeating structural carbonate units of the formula:

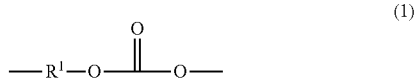

(1)

wherein at least 60 percent of the total number of $R^1$ groups contain aromatic organic groups and the balance thereof are aliphatic, alicyclic, or aromatic groups; and wherein the polycarbonate comprises cyanophenyl carbonate endcapping groups derived from the reaction with a cyanophenol of the formula:

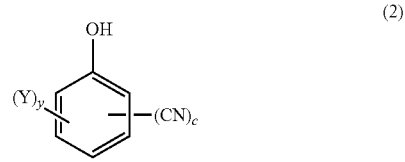

(2)

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5. The cyanophenyl endcapping groups can be present in an amount of 1 to 9 cyanophenyl carbonate units per 100 $R^1$ units, and/or the cyanophenol is p-cyanophenol, 3,4-dicyanophenol, or a combination comprising at least one of the foregoing phenols.

In addition to the polycarbonate, the core and cap layers of the multilayer sheet can include various additives ordinarily incorporated into polymer compositions of this type, with the proviso that the additive(s) are selected so as to not significantly adversely affect the desired properties of the sheet, in particular, flame retardance and transparency (e.g., will not inhibit a UL rating of V0 or a haze of less than 1.5%). Such additives can be mixed at a suitable time during the mixing of the components for forming the compositions of the core and cap layers. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as such as—carbon black and organic dyes), surface effect additives, radiation stabilizers (e.g., infrared absorbing), flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.001 to 5 wt %, based on the total weight of the composition of the particular layer.

The cap layers also comprise a sufficient amount of Rimar Salt such that the multilayer sheet attains a UL94 rating of V0. For example, the Rimar Salt can be present in the cap layer in an amount of greater than or equal to 0.03 wt %, specifically 0.04 wt % to 0.1 wt %, and more specifically, 0.06 wt % to 0.08 wt %, based upon a total weight of the layer.

The core composition can contain any flame retardant additive that does not adversely affect the transparency of the overall composition (e.g., give a haze value of greater than 1.5%). Flame retardant additives include organic and/or inorganic materials. Organic compounds include, for example, phosphorus, sulphonates, and/or halogenated materials (e.g., comprising bromine chlorine, and so forth, such as brominated polycarbonate). Non-brominated and non-chlorinated phosphorus-containing flame retardant additives can be preferred in certain applications for regulatory reasons, for example organic phosphates and organic compounds containing phosphorus-nitrogen bonds.

Inorganic flame retardant additives include, for example, $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate (e.g., KSS); salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant additive salts are present in amounts of 0.01 to 10 parts by weight, more specifically 0.02 to 1 parts by weight, based on 100 parts by weight of the total composition of the layer of the multilayer sheet in which it is included (i.e., the core or the cap layer), excluding any filler. Any combination of the above flame retardants and/or other additives disclosed herein that do not change the UL rating to worse than V0 and do not increase the haze to greater than or equal to 1.5%.

For example, the cap and/or core layers can further comprise brominated polycarbonate, e.g., to aid in achieving the desired flammability properties for the multilayer sheet for use in electrical and vehicular interior applications. The brominated polycarbonate can be present in the composition used to make the core and cap layers in an amount effective to satisfy the flammability test. Desirably, the amount of brominated polycarbonate is also chosen so as to avoid negatively impacting the transparency and/or adversely affecting the Eco label of the sheet and/or adversely the smoke density properties of the sheet.

In an exemplary embodiment, the brominated polycarbonate has a bromine content of 24 wt % to 28 wt % (e.g., 25 wt %). Exemplary amounts of brominated polycarbonate in the final composition for non eco materials can be 0.05 wt % to 10 wt %, specifically 0.1 wt % to 5 wt %, more specifically, 1 wt % to 5 wt % brominated polycarbonate, based on the total weight of the composition in the core or cap layers of the multilayer sheet. In other words, the layer can comprise 0.0125 wt % to 2.5 wt %, specifically 0.025 wt % to 1.25 wt %, more specifically 0.25 wt % to 1.25 wt % bromine, based on the total weight of the composition in the core or cap layers. For Eco materials according to the VDE norm up to 0.4 wt % of bromine in the formulation is allowed without affecting the Eco rating. This means that up to 1.6 wt % of brominated polycarbonate is allowed without affecting the Eco rating of the material if 25 wt % bromine is present in the brominated polycarbonate.

The brominated polycarbonates present in the final composition can be a high molecular weight, flame retardant, thermoplastic, aromatic polymer having a weight average molecular weight (Mw) of 8,000 to more than 200,000 atomic mass units (AMU), specifically of 20,000 to 80,000 AMU, and an intrinsic viscosity of 0.40 to 1.0 deciliters per gram (dl/g) as measured in methylene chloride at 25° C. The brominated polycarbonate can be branched or unbranched.

The brominated polycarbonate can be derived from brominated dihydric phenols and carbonate precursors. Alternatively, the brominated polycarbonate can be derived from a carbonate precursor and a mixture of brominated and non-brominated aromatic dihydric phenols. Flame retardant brominated polycarbonates are disclosed, for example, in U.S. Pat. Nos. 4,923,933, 4,170,711 and 3,929,908.

Exemplary brominated dihydric phenols include 2,2-bis(3,5-dibromo-4-hydroxyphenyl)propane and 2,2',6,6'-tetramethyl-3,3',5,5'-tetrabromo-4,4'-biphenol. Exemplary non-brominated dihydric phenols for mixing with brominated dihydric phenols to produce brominated polycarbonates include, for example, 2,2-bis(4-hydroxyphenyl)propane, bis(4-hydroxyphenyl) methane, 2,2-bis(4-hydroxy-3-methylphenyl)propane, 4,4-bis(4-hydroxyphenyl)heptane, and (3,3'-dichloro-4,4'-dihydroxydiphenyl)methane. Mixtures of two or more different brominated and non-brominated dihydric phenols can be used. Branched brominated polycarbonates can also be used, as can blends of a linear brominated polycarbonate and a branched brominated polycarbonate.

Anti-drip agents can also be used in the composition forming the core or cap layers, for example a fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. An exemplary TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Anti-drip agents can be used in amounts of 0.1 to 10 parts by weight, based on 100 parts by weight of the total composition of the particular layer, excluding any filler. The anti-dripping agent can be used in combination with the Rimar Salt in the cap layers.

The cap layer(s) can comprise a cap composition formed from polycarbonate and Rimar Salt. For example, the cap layer composition can comprise a combination of polycarbonate (e.g., branched polycarbonate and/or brominated polycarbonate) and Rimar Salt, and optionally TSAN and/or PTFE. The branched polycarbonate can be present such that the cap layer comprises 50 wt % to 98 wt %, specifically, 60 wt % to 80 wt %, more specifically, 70 wt % to 75 wt % branched polycarbonate, based on the total weight of the composition in the cap layer. When brominated polycarbonate is employed, it can be present such that the layer comprises 0.0125 wt % to 2.5 wt %, specifically 0.025 wt % to 1.25 wt %, more specifically 0.25 wt % to 1.25 wt % bromine, based on the total weight of the composition in the layer, e.g., 1 wt % bromine. The remainder of the cap layer composition can comprise polycarbonate and optionally, various additives such as those discussed above.

The thickness of cap layer(s) varies depending upon the desired end use of the multilayer sheet. The cap layer should be sufficiently thin so that the haze of the multilayer sheet remains less than 1.5%. For example, the cap layer, which can be disposed on one or both sides of the core layer, can have a thickness of less than or equal to 200 micrometers (μm) so long as the haze of the multilayer sheet remains less than 1.5%, specifically, 25 μm to 125 μm, more specifically 50 μm to 100 μm, and even more specifically, 75 μm to 90 μm (e.g., 80 μm).

The core layer can be formed from a core composition comprising polycarbonate (e.g., the polycarbonates described above in relation to the cap layers) and optionally flame retardant additive(s) as described above. The flame retardant additive can comprise any flame retardant additive that does not adversely affect the transparency of the core layer and/or the multilayer sheet. The core and cap layers can contain different combinations or the same combination of polycarbonate materials. For example, the core layer can be formed from a core composition comprising a combination of branched polycarbonate and brominated polycarbonate, while the flame retardant additive, if present, can comprise potassium diphenyl sulfone sulfonate (e.g., KSS). The branched polycarbonate can be present such that the core layer comprises 50 wt % to 98 wt %, specifically, 60 wt % to 80 wt %, more specifically, 70 wt % to 75 wt % branched polycarbonate, based on the total weight of the composition in the core layer. Alternatively, or in addition, the core layer can comprise brominated polycarbonate present in an amount such that the core layer comprises 0.5 wt % to 5 wt %, specifically 1 wt % to 2 wt % brominated polycarbonate, based on the total weight of the core layer composition, e.g., 1 wt % bromine in the core layer. The remainder of the core layer composition comprises various additives as discussed above.

As with the cap layers, the thickness of core layer varies depending upon the desired end use of the multilayer sheet. Generally, the thickness of the core layer can be less than or equal to 15 mm, specifically, 1 mm to 5 mm, more specifically, 1 mm to 2 mm, even more specifically, 1.2 mm to 1.8 mm, and still more specifically, 1.5 mm to 1.8 mm. The total thickness of the multilayered sheet (including the core layer, cap layer(s), and any additional layers and coatings) can be less than or equal to 15 mm, e.g., 1.0 mm to 15 mm.

It is further contemplated that the multilayer sheet can comprise additional core and cap layers (e.g., greater than or equal to two core layers and/or greater than or equal to three cap layers). Additionally, the multilayer sheet can also comprise layers dispersed between the core and cap layers, for example, an interlayer or an adhesive layer, such that the core layer can then be in contact with the interlayer and the interlayer can be in contact with the cap layer, or any combination thereof. Additional layers or coatings can also be present on the surface of the cap layers (such that the cap layer is between the coating and the core layer). Such layers can include, but are not limited to, hardcoats (e.g., an abrasion resistant coating), UV resistant layers, IR absorbing layers, etc. The additional layers contemplated can be added with the proviso that they not adversely affect the desired properties of the multilayer sheet (i.e., transparency (haze remains less than 1.5%), flame retardancy (retaining at least a UL rating of V0 at a thickness of 1.8 mm), and/or smoke density (consistently passing smoke density testing)). Any feasible combination of the above described additional layers is also contemplated.

The multilayer sheet can be formed by various multilayer sheet forming techniques. Some exemplary techniques include co-extrusion, lamination, coating (e.g., in a roll mill or a roll stack), and so forth.

The multilayer sheets and methods of making are further illustrated by the following non-limiting examples.

EXAMPLES

In the examples, sheets comprising various combinations of the materials listed in Table 1 were evaluated for various flame retarding and transparency properties.

TABLE 1

| Material Name | Chemical Name |
| --- | --- |
| PC-Br | Co-polymer of TBBPA (tetrabromo bisphenol acetone) and BPA containing 25 wt % bromine |
| PC | High viscosity TMTC (trimellitic trichloride) branched polycarbonate |
| KSS | Potassium diphenyl sulfon-3-sulfonate |
| Rimar Salt | Potassium perfluorobutane sulfonate |

Haze, Glow Wire, and UL94 flammability tests were conducted for various combinations of sheets made from the materials listed in Table 1. Haze was measured according to ASTM D1003-00, Procedure B. While optimum haze levels can vary depending upon the application, it is generally accepted that lower haze levels are desirable for transparent polycarbonate sheet applications. Flammability tests were performed following the procedure of the Underwriter's Laboratory Bulletin 94 entitled "Tests for Flammability of Plastic Materials, UL94". According to this procedure, the materials are classified as UL94 V0, UL94 V1, or UL94 V2 on the basis of the test results obtained for five samples. The procedure and criteria for each of these flammability classifications according to UL94, are, briefly, as follows:

Procedure: A total of 10 specimens (2 sets of 5) are tested per thickness. Five specimens of each thickness are tested after conditioning for 48 hours at 23° C. and 50% relative humidity. The other five specimens of each thickness are tested after conditioning for seven days at 70° C. The bar is mounted with the long axis vertical for flammability testing. The specimen is supported such that its lower end is 9.5 mm above the Bunsen burner tube. A blue 19 mm high flame is applied to the center of the lower edge of specimen for 10 seconds. The time until the flaming of the bar ceases is recorded. If burning ceases, the flame is re-applied for an additional 10 seconds. Again, the time until the flaming of the bar ceases is recorded. If the specimen drips particles, these shall be allowed to fall onto a layer of untreated surgical cotton placed 305 mm below the specimen.

Table 2 lists the criteria for flammability classifications according to UL94:

TABLE 2

| Criteria Conditions | V0 | V1 | V2 |
| --- | --- | --- | --- |
| Afterflame time for each individual specimen | ≤10 s | ≤30 s | ≤30 s |
| Total afterflame time for any condition set (5 specimens) | ≤50 s | ≤250 s | ≤250 s |
| Afterflame plus afterglow time for each individual specimen after the second flame application | ≤30 s | ≤60 s | ≤60 s |
| Afterflame or afterglow of any specimen up to the holding clamp | No | No | No |
| Cotton indicator ignited by flaming particles or drops | No | No | Yes |

Afterflame time in Table 2 refers to the time at which the specimen continues to burn after the flame has been removed (i.e, the time until the flaming of the specimen ceases). Glow Wire tests were tested at 960° C. and measured according to CEI 695-2-1/IEC 60695-2-12 on three specimens measuring 60 mm by 60 mm. The Glow Wire test consists of an apparatus where an electrical resistance (Glow Wire) connected to a power supply is heated to a specified temperature, in the present examples, 960° C. A test specimen is then held for 30 seconds against the tip of the Glow Wire with a force of 1 Newton. After the Glow Wire is removed, the time for the flames to extinguish is noted together with details of any burning droplets. Materials that surround the test material in its normal application, or a layer of tissue paper, is placed beneath the specimen during the test to determine the effects of burning droplets. The material is considered to pass the test if there is no flame and no glow or if flames, glowing of the specimen, or surrounding material extinguish within 30 seconds after removal of the glow wire. For plastics, in contact with live electrical parts, the highest temperature at which the plastic passes the test is determined at which in three successive tests one of the following conditions is satisfied: no ignition of the sample or no burning or glowing time after removal of the Glow Wire for less than or equal to 30 seconds and no ignition of the temperature indicator.

Comparative Example 1 comprised a core layer formed from a core composition comprising 70 wt % PC, 1 wt % PC-Br, 0.1 wt % KSS, and 0.06 wt % Rimar Salt. Comparative Example 1 possessed an Eco label according to DIN/VDE 0472 Part 815, where the total bromine content in the composition is less than 0.4%. The thickness of the core layer was 2 mm.

Comparative Example 2 comprised a core layer formed from a core composition comprising 70 wt % PC, 1 wt % PC-Br, and 0.1 wt % KSS. Comparative Example 2 also possessed an Eco label according to DIN/VDE 0472 Part 815. The thickness of the core layer was 2 mm.

Comparative Example 3 comprises a core layer formed form a core composition comprising 70 wt % branched PC, 1 wt % PC-Br, 0.1 wt % KSS, and 0.08 wt % Rimar Salt, with the balance being linear PC. Comparative Example 3 possessed an Eco label according to DIN/VDE 0472 Part 815. The thickness of the core layer was 2 mm.

Example 1 comprised first and second cap layers disposed upon opposite surfaces of the core layer. The first and second cap layers were co-extruded onto opposite surfaces of the core layer using a standard single manifold co-extrusion process. The first and second cap layers were each formed from cap compositions comprising 70 wt % branched PC, 1 wt % PC-Br, 0.1 wt % KSS, and 0.06 wt % Rimar Salt, with the balance being linear PC while the core layer was formed from a core composition comprising 70 wt % branched PC, 1 wt % PC-Br, and 0.1 wt % KSS, with the balance being linear PC. The multilayer sheet formed from the core and cap layers of Example 1 possessed an Eco label according to DIN/VDE 0472 Part 815. The first and second cap layers each comprised a thickness of 80 micrometers (μm), while the core layer comprised a thickness of 1.84 mm.

Example 2 comprised first and second cap layers disposed upon opposite surfaces of the core layer. The first and second cap layers were co-extruded on sides of the core layer using a standard single manifold co-extrusion process. The first and second cap layers were each formed from cap compositions comprising 70 wt % branched PC, 1 wt % PC-Br, 0.1 wt % KSS, and 0.08 wt % Rimar Salt, with the balance being linear PC, while the core layer was formed from a core composition comprising 70 wt % branched PC, 1 wt % PC-Br, and 0.1 wt % KSS, with the balance being linear PC. The multilayer sheet formed from the core and cap layers of Example 1 possessed an Eco label according to DIN/VDE 0472 Part 815. The first and second cap layers each comprised a thickness of 80 micrometers (μm), while the core layer comprised a thickness of 1.84 mm.

Table 3 illustrates the results from each of the tests for Comparative Examples 1 and 2 and Example 1.

TABLE 3

|  | UL94 FR Rating | Haze | Glow Wire at 960° C. |
|---|---|---|---|
| Comparative Example 1 | V0 at 1.6 mm | 2.5% | Passed |
| Comparative Example 2 | V2 at 2.0 mm | 0.9% | Passed |
| Comparative Example 3 | V0 at 1.6 mm | 5% | Passed |
| Example 1 | V0 at 2.0 mm | 1.1% | Passed |
| Example 2 | V0 at 1.8 mm | 1.3% | Passed |

To be considered for use in electrical or interior applications, the sheet material should possess an Eco label according to DIN/VDE 0472 Part 815, have a UL94 V0 rating at a minimum thickness of 1.8 mm, should pass the Glow Wire test at 960° C., and have a haze value of less than 1.5%. As can be seen from Table 3, Comparative Example 1, which contained Rimar Salt in the core layer, had a UL94 V0 rating at 1.6 mm and passed the Glow Wire test at 960° C., but had a haze value of 2.5%, which is outside the acceptable range for transparent polycarbonate sheet applications. Comparative Example 2, which did not contain Rimar Salt, passed the Glow Wire Test at 960° C. and had a haze value of 0.9%, but had an unacceptable UL94 V-2 rating at 2.0 mm Surprisingly, it was discovered that Example 1, comprising first and second cap layers co-extruded onto a core layer, where the first and second cap layers contained Rimar Salt, passed all three tests, with a UL94 V0 rating at 2.0 mm, a haze value of 1.1%, and passed the Glow Wire test at 960° C.

It was wholly unexpected that the use of so little Rimar Salt in the overall multilayer sheet was sufficient to attain the UL94 V0 rating, low haze, and smoke density. Here, the amount of Rimar Salt in the multilayer sheet (i.e., the combined core layer, cap layer(s) and any other layer(s)) is less than or equal to 0.01 wt %, specifically less than 0.008 wt %, and even less than 0.005 wt %, depending upon the thickness of the core layer and the cap layer(s). In order to attain UL94 V0 in a monolayer sheet (monolithic sheet), greater than or equal 0.06 wt % Rimar Salt was required and the haze value was high (greater than 1.5%). Adding Rimar Salt in such a small concentration as disclosed herein (e.g., less than or equal to 0.01 wt %) in a monolayer sheet would have little or no effect on the flame retardancy of the sheet; that is, the UL94 rating would be V2, i.e., worse than V0. It was surprisingly discovered that the use of Rimar Salt in a multilayer sheet where the Rimar Salt is present in cap layers disposed on both sides of a core layer so that the total concentration of Rimar Salt in multilayer sheet is less than or equal to 0.01 wt % Rimar Salt results in a multilayer sheet possessing a UL 94 V0 rating (e.g., at a thickness of 1.8 mm), a haze value of less than 1.5%, and passes the Glow Wire test at 960° C.

Comparative Example 1 demonstrates the problems associated with using Rimar Salt in the core layer, where Comparative Example 1 contained Rimar Salt and had an unacceptable haze value. Comparative Example 2 illustrates that the desired haze value can be achieved without the use of Rimar Salt, but the UL94 rating can simultaneously be compromised. Comparative Examples 1 and 2 demonstrate that the use of Rimar Salt is effective at providing the desired UL94 rating, but not as effective at providing a transparent polycarbonate substrate with a haze value of less than 1.5% when present in the core layer. It was unexpectedly discovered that the use of Rimar Salt in first and second cap layers formed from cap compositions comprising polycarbonate and Rimar Salt over a core composition comprising polycarbonate, but not Rimar Salt, resulted in a transparent polycarbonate multilayer sheet with an acceptable haze value, an UL94 flame retardant rating of V0 at 2.0 mm, and a pass of the Glow Wire test at 960° C., all while also possessing an Eco VDE label. It was unexpected that the use of Rimar Salt in both the first and second cap layers would not adversely affect the UL rating.

The flame retardant multilayer sheets disclosed herein comprise a core layer formed from a core composition comprising polycarbonate, in combination with first and second cap layers that are disposed upon and in intimate contact with opposite surfaces of the core layer, where the cap layers are formed from a cap composition comprising polycarbonate and Rimar Salt. The multilayer sheets disclosed herein, in which the above described cap and core layers are co-extruded, have an Eco label according to DIN/VDE 0472 Part 815, a UL94 V0 rating at a minimal thickness of 1.8 mm, a haze value of not greater than 1.5%, and pass the Glow Wire test at 960° C. The multilayer sheets disclosed herein are capable of use in electrical and interior applications. The unique combination of cap layers and a core layer where the cap layers comprise Rimar Salt produces a multilayer sheet capable of meeting stringent fire safety guidelines, while also being able to satisfy Eco and optical requirements.

In one embodiment, a multilayer sheet comprises: a first cap layer formed from a first cap composition comprising polycarbonate and potassium perfluorobutane sulfonate; a second cap layer formed from a second cap composition comprising polycarbonate and potassium perfluorobutane sulfonate; and a core layer formed from a core composition comprising polycarbonate and without potassium perfluorobutane sulfonate. The core layer is disposed between the first cap layer and the second cap layer. In one embodiment, an article comprises the multilayer sheet.

In one embodiment a method of making a multilayer sheet comprises: forming a core layer formed from a core composition comprising polycarbonate; forming a first cap layer formed from a first cap composition comprising polycarbonate and potassium perfluorobutane sulfonate wherein the first cap layer is co-extruded onto a surface of the core layer; and forming a second cap layer formed from a second cap composition comprising polycarbonate and potassium perfluorobutane sulfonate wherein the second cap layer is co-extruded onto a surface of the core layer opposite the surface co-extruded with the first cap layer.

In the various embodiments: (i) the core composition polycarbonate and the first and second cap compositions are selected from the group consisting of linear polycarbonate, copolymers of polycarbonate, branched polycarbonate, end-capped polycarbonate, and combinations comprising at least one of the foregoing; (ii) the amount of potassium perfluorobutane sulfonate in the multilayer sheet is less than 0.01 wt % based upon a total weight of the multilayer sheet; (iii) the core layer flame retardant additive comprises potassium diphenyl sulfone-3-sulfonate; (iv) the first cap layer contains greater than or equal to 0.03 wt % potassium perfluorobutane sulfonate, based upon a total weight of the first cap layer and the second cap layer contains greater than or equal to 0.03 wt % potassium perfluorobutane sulfonate, based upon a total weight of the second cap layer; the multilayer sheet has a UL94 V0 rating at a thickness of 1.8 mm; (v) the sheet has a haze value of less than or equal to 1.5% as measured by ASTM D1003-00, Procedure A; (vi) the cap layer comprises a thickness of less than or equal to 200 micrometers; (vii) the core layer is co-extruded with the first cap layer and the second cap layer; (viii) the first and/or second cap layers further comprise an anti-dripping agent selected from the group consisting of PTFE, TSAN, and combinations comprising at least one of the foregoing; (ix) the core layer has a thickness of less than or equal to 5 mm; and/or (x) the core layer has a thickness of less than or equal to 2 mm.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films) Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multilayer sheet, comprising:
    a first cap layer formed from a first cap composition comprising potassium perfluorobutane sulfonate, 50wt % to 98wt % branched polycarbonate, and a brominated polycarbonate such that the first cap composition comprises 0.0125wt % to 2.5wt % bromine, based on the total weight of the first cap composition;
    a second cap layer formed from a second cap composition comprising potassium perfluorobutane sulfonate, 50wt % to 98wt % branched polycarbonate, and a brominated polycarbonate such that the second cap composition comprises 0.0125wt % to 2.5wt % bromine, based on the total weight of the second cap composition; and
    a core layer formed from a core composition comprising 50wt % to 98wt % branched polycarbonate and 0.5wt % to 5wt % brominated polycarbonate, based on the total weight of the core composition, and without potassium perfluorobutane sulfonate, wherein the core layer is disposed between the first cap layer and the second cap layer;
    wherein the first cap composition comprises greater than or equal to 0.05wt % potassium perfluorobutane sulfonate, based upon a total weight of the first cap composition; and
    wherein the second cap composition comprises greater than or equal to 0.05wt % potassium perfluorobutane sulfonate, based upon a total weight of the second cap composition;
    wherein the multilayer sheet has a UL94 V0 rating at a thickness of 1.8 mm; and wherein the multilayer sheet has a haze value of less than or equal to 1.5% as measured by ASTM D1003-00, Procedure A.

2. The multilayer sheet of claim 1, wherein the amount of potassium perfluorobutane sulfonate in the multilayer sheet is less than 0.01 wt % based upon a total weight of the multilayer sheet.

3. The multilayer sheet of claim 1, wherein the core composition comprises potassium diphenyl sulfone-3-sulfonate.

4. The multilayer sheet of claim 1, wherein the first cap layer and/or the second cap layer have a thickness of less than or equal to 200 micrometers.

5. The multilayer sheet of claim 1, wherein the core layer is co-extruded with the first cap layer and the second cap layer.

6. The multilayer sheet of claim 1, wherein the first and/or second cap compositions further comprise an anti-dripping agent selected from the group consisting of PTFE, TSAN, and combinations comprising at least one of the foregoing.

7. The multilayer sheet of claim 1, wherein the core layer has a thickness of less than or equal to 2 mm.

8. An article comprising the multilayer sheet of claim 1.

9. The multilayer sheet of claim 1, wherein the first cap composition and/or second cap composition comprises 60wt % to 80wt % branched polycarbonate, based on the total weight of the first cap composition and/or second cap composition, respectively.

10. The multilayer sheet of claim 9, wherein the first cap composition and/or second cap composition comprises a brominated polycarbonate such that the first cap composition and/or second cap composition comprises 0.025wt % to 1.25wt % bromine, based on the total weight of the first cap composition and/or second cap composition, respectively.

11. The multilayer sheet of claim 1, wherein the core composition comprises 60wt % to 80wt % branched polycarbonate, based on the total weight of the core composition.

12. The multilayer sheet of claim 11, wherein the core composition comprises 1wt % to 2wt % brominated polycarbonate, based on the total weight of the core composition.

13. A method of making a multilayer sheet, comprising:
    forming a core layer formed from a core composition comprising 50 wt % to 98wt % branched polycarbonate and 0.5wt % to 5wt% brominated polycarbonate, based on the total weight of the core composition and without potassium perfluorobutane sulfonate;
    forming a first cap layer formed from a first cap composition comprising potassium perfluorobutane sulfonate, 50wt % to 98wt % branched polycarbonate, and a brominated polycarbonate such that the first cap composition comprises 0.0125wt% to 2.5wt% bromine, based on the total weight of the first cap composition, wherein the first cap layer is co-extruded onto a surface of the core layer; and
    forming a second cap layer formed from a second cap composition comprising potassium perfluorobutane sulfonate, 50wt % to 98wt % branched polycarbonate, and a brominated polycarbonate such that the second cap composition comprises 0.0125wt % to 2.5wt % bromine, based on the total weight of the second cap composition wherein the second cap layer is co-extruded onto a surface of the core layer opposite the surface co-extruded with the first cap layer,
    wherein the first cap composition comprises greater than or equal to 0.05wt % potassium perfluorobutane sulfonate, based upon a total weight of the first cap composition;
    wherein the second cap composition comprises greater than or equal to 0.05wt % potassium perfluorobutane sulfonate, based upon a total weight of the second cap composition; and wherein the multilayer sheet has a UL94 V0 rating at a thickness of 1.8 mm; and wherein the multilayer sheet has a haze value of less than or equal to 1.5% as measured by ASTM D1003-00, Procedure A.

* * * * *